United States Patent
Chen et al.

(10) Patent No.: US 12,367,096 B2
(45) Date of Patent: Jul. 22, 2025

(54) SERVICE CONTROL METHOD BASED ON SERVICE CLUSTER, ELECTRONIC DEVICE AND STORAGE MEDIUM

(71) Applicants: National University of Singapore, Singapore (SG); Beijing Volcano Engine Technology Co., Ltd., Beijing (CN)

(72) Inventors: Zhanghao Chen, Beijing (CN); Yifan Zhang, Beijing (CN); Meng Wang, Beijing (CN); Guanghui Zhang, Beijing (CN); Yong Fang, Beijing (CN); Rui Shi, Beijing (CN); Tianbai Ma, Singapore (SG); Yancan Mao, Singapore (SG)

(73) Assignees: National University of Singapore, Singapore (SG); Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/758,721

(22) Filed: Jun. 28, 2024

(65) Prior Publication Data

US 2025/0036517 A1    Jan. 30, 2025

(30) Foreign Application Priority Data

Jul. 28, 2023   (CN) .......................... 202310949968.8

(51) Int. Cl.
  *G06F 11/00*   (2006.01)
  *G06F 9/4401*  (2018.01)
  (Continued)

(52) U.S. Cl.
  CPC ........ *G06F 11/0793* (2013.01); *G06F 9/4401* (2013.01); *G06F 9/5072* (2013.01); *G06F 11/0709* (2013.01); *G06F 11/079* (2013.01)

(58) Field of Classification Search
  CPC .............. G06F 11/0793; G06F 11/079; G06F 11/0709; G06F 11/3006; G06F 11/3051;
  (Continued)

(56) References Cited

U.S. PATENT DOCUMENTS 8,869,036 B1 * 10/2014 Deshpande ......... G06F 11/3065
                                                 715/736
12,056,000 B1 * 8/2024 Kawata ............... G06F 11/0793
(Continued)

FOREIGN PATENT DOCUMENTS

CN    112506737 A    3/2021

OTHER PUBLICATIONS

Amazon., "Amazon CloudWatch User Guide", XP093227339, Retrieved from the Internet: URL: https://web.archive.org/web/20230530171719if/ https://docs.aws.amazon.com/pdfs/AmazonCloudWatch/latest/monitoring/acw-ug.pdf , May 30, 2023 , pp. 1-400.
(Continued)

*Primary Examiner* — Joseph D Manoskey

(57) ABSTRACT

A service control method based on a service cluster, an electronic device, and a storage medium are described. The method includes: acquiring operation index information generated by a target service cluster when a task runs; calling one or more strategy models in a strategy model library to perform anomaly analysis on the operation index information, and determining target anomaly information of an anomaly occurring in the target service cluster when the task runs and a corresponding target solution strategy; and sending a configuration updating indication carrying the target solution strategy to the target service cluster.

20 Claims, 3 Drawing Sheets

(51) Int. Cl.
*G06F 9/50* (2006.01)
*G06F 11/07* (2006.01)

(58) Field of Classification Search
CPC ............ G06F 11/0766; G06F 11/3065; G06F 9/4401; G06F 9/5072
See application file for complete search history.

(56) References Cited

U.S. PATENT DOCUMENTS

| | | | |
|---|---|---|---|
| 2013/0204948 A1* | 8/2013 | Zeyliger | G06F 11/3055 709/221 |
| 2018/0239682 A1* | 8/2018 | Kaluza | G06F 11/3006 |
| 2020/0344252 A1* | 10/2020 | Menon | G06F 11/3006 |
| 2023/0333903 A1* | 10/2023 | White | G06F 9/505 |
| 2024/0223579 A1* | 7/2024 | Sundararajan | H04L 63/20 |

OTHER PUBLICATIONS

Communication pursuant to Rule 69 EPC for European Application No. 24180514.2, mailed Feb. 17, 2025, 2 pages.
Extended European Search Report for European Application No. 24180514.2, mailed Jan. 10, 2025, 8 pages.

* cited by examiner

SERVICE CONTROL METHOD BASED ON SERVICE CLUSTER, ELECTRONIC DEVICE AND STORAGE MEDIUM

CROSS-REFERENCE TO RELATED APPLICATION

The present application claims priority of the Chinese Patent Application No. 202310949968.8, filed on Jul. 28, 2023, the disclosure of which is incorporated herein by reference in its entirety as part of the present application.

TECHNICAL FIELD

The present disclosure relates to the technical field of computers, in particular to a service control method based on a service cluster, an electronic device and a storage medium.

BACKGROUND

With the increasing demand for real-time data processing in business, the streaming processing for streaming data has been more and more widely applied. Apache Flink, as a widely used computing engine for the streaming processing, can run in a complex distributed environment for a long time to perform each Flink task, so as to implement the real-time processing for the streaming data. However, because streaming data has a volatility characteristic, various types of runtime problems often occur in the service cluster to which the Flink tasks belong during the operation of the Flink tasks.

In order to solve the runtime problems, it usually adopts an approach of reporting the runtime problems to an analysis terminal for manually analyzing the indexes and problems in the running process by engine experts and then modifying the cluster information, which not only needs to consume a lot of human resources, but also reduces the efficiency of solving the runtime problems. Moreover, in the case of large-scale deployment of Flink tasks, the disadvantage of manual solution will be amplified, the consumption of human resources will be larger, and the solution efficiency will be lower.

SUMMARY

The embodiments of the present disclosure provide at least a service control method and apparatus based on a service cluster, an electronic device, and a storage medium.

An embodiment of the present disclosure provides a service control method based on a service cluster, and the method includes:

acquiring operation index information generated by a target service cluster when a task runs;

calling one or more strategy models in a strategy model library to perform anomaly analysis on the operation index information, and determining target anomaly information of an anomaly occurring in the target service cluster when the task runs and a corresponding target solution strategy, wherein the strategy model library is used to maintain the one or more strategy models, and each strategy model is used to analyze an anomaly situation in a certain dimension that exists in the target service cluster when the task runs, and formulate a solution strategy for the anomaly situation, wherein different strategy models respectively have an ability of analyzing anomaly situations in different dimensions and formulating corresponding solution strategies; and sending a configuration updating indication carrying the target solution strategy to the target service cluster, wherein the configuration updating indication is used to indicate the target service cluster to modify configuration information of the target service cluster according to the target solution strategy.

In a possible implementation, the sending a configuration updating indication carrying the target solution strategy to the target service cluster, includes:

according to a strategy type to which the target solution strategy belongs, determining a target interface matched with the strategy type from a plurality of configuration modification interfaces corresponding to the target service cluster, wherein different configuration modification interfaces are used to call different configuration modification functions, and the different configuration modification functions are preset according to the anomaly situations in different dimensions; and sending the configuration updating indication to the target service cluster through the target interface, and calling a target configuration modification function matched with the target interface, wherein the target service cluster is configured to use the target configuration modification function that is called, and modify the configuration information of the target service cluster according to the target solution strategy carried in the configuration updating indication.

In a possible implementation, the sending a configuration updating indication carrying the target solution strategy to the target service cluster, includes:

determining a total quantity of solution strategies that have been generated in a preset historical period; and in a case where the total quantity is less than a preset quantity, sending the configuration updating indication carrying the target solution strategy to the target service cluster.

In a possible implementation, the acquiring operation index information generated by a target service cluster when a task runs, includes:

receiving the first check request sent by the target service cluster, and in a case where the first check request is used to request to perform a multi-dimensional runtime anomaly detection on the target service cluster, then in response to the first check request, executing the acquiring operation index information generated by the target service cluster when the task runs; or, receiving the second check request sent by an operation and maintenance terminal, and in a case where the second check request is used to request to perform a multi-dimensional runtime anomaly detection on the target service cluster, then in response to the second check request, executing the acquiring operation index information generated by the target service cluster when the task runs.

In a possible implementation, the acquiring operation index information generated by a target service cluster when a task runs, includes:

acquiring operation index information corresponding to the target service cluster during an execution time period from an index database corresponding to the target service cluster, wherein the index database is used to dynamically maintain the operation index information generated when the target service cluster executes the task.

In a possible implementation, the calling one or more strategy models in a strategy model library to perform anomaly analysis on the operation index information, and determining target anomaly information of an anomaly occurring in the target service cluster when the task runs and a corresponding target solution strategy, includes:

calling the one or more strategy models in the strategy model library to perform anomaly analysis on the operation index information, and obtaining an anomaly analysis result output by each strategy model; and based on the anomaly analysis result and a priority corresponding to each strategy model, selecting an anomaly analysis result that has a highest priority and characterizes the anomaly existing as a target anomaly analysis result, wherein the target anomaly analysis result includes the target anomaly information and the corresponding target solution strategy.

In a possible implementation, the calling the one or more strategy models in the strategy model library to perform anomaly analysis on the operation index information, and obtaining an anomaly analysis result output by each strategy model, includes:

for any one of the strategy models that are called, using the strategy model to acquire execution condition information of the target service cluster when the task runs and strategy configuration information corresponding to the strategy model from a preset target database, wherein the target database is used to dynamically maintain the execution condition information set for each service cluster and the strategy configuration information set for each strategy model;

according to each task execution condition indicated by the execution condition information, judging whether the operation index information indicates that the target service cluster has the anomaly situation; and in response to the target service cluster having the anomaly situation, according to the strategy configuration information, formulating the solution strategy for the anomaly situation existing in the target service cluster, and taking the anomaly situation and the solution strategy as the output anomaly analysis result.

In a possible implementation, according to the strategy configuration information, the formulating the solution strategy for the anomaly situation existing in the target service cluster, includes:

acquiring historical state information of the target service cluster in a case where the anomaly situation is that cluster resources are larger than target resources required when the task runs, wherein the historical state information is used to indicate resource node quantities of the target service cluster in different time periods;

determining a first resource node quantity in a target time period from resource node quantities indicated by the historical state information;

determining a target resource node quantity according to the first resource node quantity and a second resource node quantity required for providing the target resources; and formulating the solution strategy for the anomaly situation according to the strategy configuration information, wherein the solution strategy is used to indicate that an original resource node quantity corresponding to the cluster resources is reduced to the target resource node quantity.

Further an embodiment of the present disclosure provides a service control apparatus based on a service cluster, which includes an acquiring module, a determining module and a sending module.

The acquiring module is configured to acquire operation index information generated by a target service cluster when a task runs.

The determining module is configured to call one or more strategy models in a strategy model library to perform anomaly analysis on the operation index information, and determine target anomaly information of an anomaly occurring in the target service cluster when the task runs and a corresponding target solution strategy. The strategy model library is used to maintain the one or more strategy models, and each strategy model is used to analyze an anomaly situation in a certain dimension that exists in the target service cluster when the task runs, and formulate a solution strategy for the anomaly situation. The different strategy models respectively have an ability of analyzing anomaly situations in different dimensions and formulating corresponding solution strategies.

The sending module is configured to send a configuration updating indication carrying the target solution strategy to the target service cluster. The configuration updating indication is used to indicate the target service cluster to modify configuration information of the target service cluster according to the target solution strategy.

Further another embodiment of the present disclosure provides an electronic device, and the electronic device includes at least one processor and a memory. The memory stores machine-readable instructions executed by the at least one processor, and the at least one processor is used to execute the machine-readable instructions stored in the memory. When the machine-readable instructions are executed by the at least one processor, the at least one processor executes the steps of any one of the above implementations.

Further an embodiment of the present disclosure provides a non-transient computer-readable storage medium. The non-transient computer-readable storage medium stores computer programs, and when the computer programs are run by an electronic device, the electronic device executes the steps of any one of the above implementations.

The description of the effects of the above electronic device and computer-readable storage medium based on the service cluster, refers to the illustration of the above service control method based on the service cluster, which will not be repeated herein.

In order to make the above purposes, features and advantages of the present disclosure more obvious and easier to understand, the following better embodiments with the accompanying drawings are described in detail as follows.

BRIEF DESCRIPTION OF DRAWINGS

In order to more clearly illustrate the technical solutions of the embodiments of the present disclosure, the drawings required to be used in the embodiments are briefly described below, and the drawings herein are incorporated into the description and form part of the present description, which show the embodiments that conform to the present disclosure and are used together with the description to illustrate the technical solutions of the present disclosure. It should be understood that the following drawings only show some embodiments of the present disclosure and should not be regarded as limiting the scope, and that other relevant drawings may be obtained from those drawings without creative effort on the premise that a person of ordinary skill in the art is employed.

DETAILED DESCRIPTION

Figure 1:
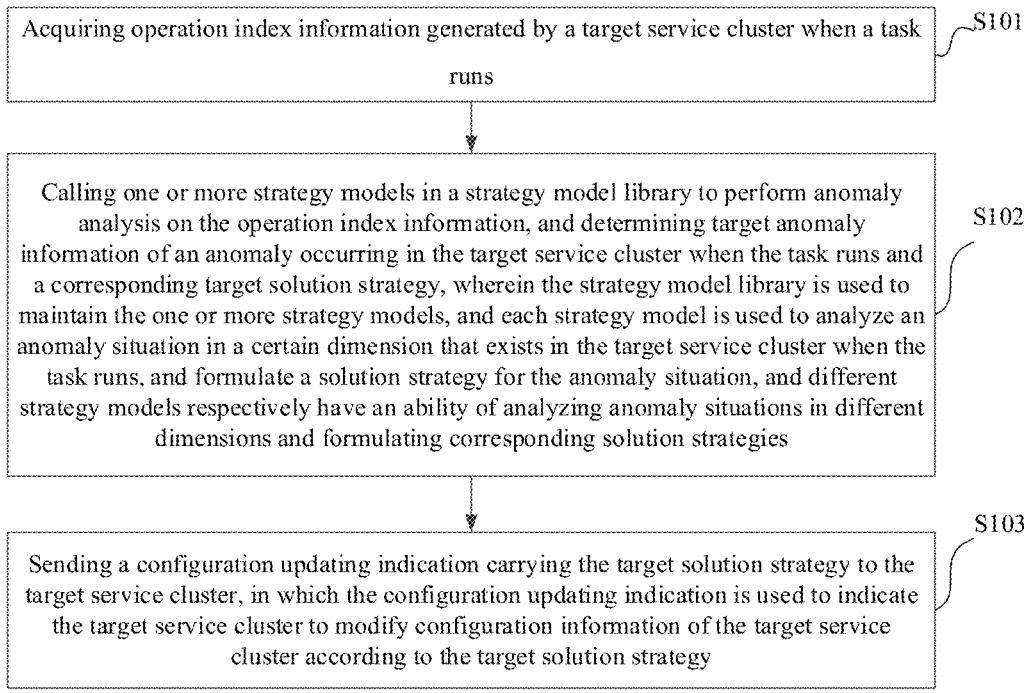
FIG. 1 illustrates a flowchart of a service control method based on a service cluster provided by an embodiment of the present disclosure.

In order to make the purpose, technical solution and advantages of the embodiments of the present disclosure clearer, the technical solutions in the embodiments of the present disclosure will be clearly and completely described below in conjunction with the accompanying drawings in the embodiments of the present disclosure, and it is obvious that the described embodiments are only part of the embodiments of the present disclosure, not all embodiments. The components of the present disclosed embodiment, which is typically described and shown here, may be laid out and designed in a variety of different configurations. Therefore, the following detailed description of embodiments of the present disclosure is not intended to limit the scope of the claimed disclosure, but merely indicates the selected embodiments of the present disclosure. Based on the embodiments of the present disclosure, all other embodiments obtained by a person skilled in the art without creative work fall within the scope of protection of the present disclosure.

In addition, the terms "first", "second", etc., in the description and claims in the present embodiment and in the above-mentioned drawings are used to distinguish similar objects, and are not necessarily used to describe a specific order or sequence. It should be understood that the data thus used are interchangeable where appropriate so that the embodiments described here can be implemented in an order other than what is illustrated or described here.

References to "plural or several" in this article refer to two or more of them. "And/or" describes the relationship between the associated object, indicating that there can be three relationships, for example, A and/or B, which can be dedicated: A alone, both A and B at the same time, and B alone. The character "/" generally indicates that the relationship between the preceding and posting objects is an "or".

It is found that during the operation of Flink tasks, the runtime problems that occur in the service cluster to which the Flink tasks belong can include the problem of insufficient/excessive job resources because of changes in traffic, the problem of "slow nodes" caused by changes in the node operating environment that results in the decrease in the node processing performance, and the problem of run errors caused by an anomaly in an external service. No matter what type of the runtime problems, the usual approach adopted is to manually perform anomaly analysis on the service cluster, and then modify the cluster configuration to make the service cluster run in the optimal state, so as to resolve the runtime problems. However, in the case of large-scale deployment of Flink tasks, the manual solution not only consumes a lot of human resources, but also affects the efficiency of solving the problems. Of course, there are some automatic solutions, but these solutions are optimized for the single type of runtime problem only, and cannot resolve each runtime problem that may occur, do not have generality and universality, and are not suitable for the unified management of large-scale service clusters.

Based on the above research, one or more embodiments of the present disclosure provides a service control method and apparatus based on a service cluster, an electronic device and a storage medium. By acquiring operation index information generated by a target service cluster when a task runs, and using one or more strategy models that have the ability to analyze and solve different anomaly situations of the service cluster to perform anomaly analysis on the operation index information, the analysis and detection of one or more types of runtime problems (i.e., anomaly situations in a certain dimension) for the target service cluster can be implemented, and the target anomaly information that may exist in the target service cluster can be determined quickly and accurately, and a corresponding target solution strategy can be provided. By sending the configuration updating indication carrying the target solution strategy to the target service cluster, the service control of the target service cluster can be implemented, and then the target service cluster can be indicated to modify the cluster configuration information in time according to the target solution strategy, which improves the efficiency of solving the target anomaly information. Moreover, the detection of each type of runtime problem that may occur in the target service cluster can be implemented through the plurality of strategy models maintained in the strategy model library, which improves the comprehensiveness of problem detection. Because each strategy model can also provide the target solution strategy for the target anomaly information, each type of runtime problem can be solved uniformly by using each of the strategy models. At the same time, the above-mentioned process of performing anomaly analysis on the target service cluster and processing the target anomaly information can be implemented in a completely automatic process without manual participation, and therefore, the consumption of human resources can be avoided, and the speed of anomaly detection and the efficiency of solving the anomaly can be improved.

The findings of the defects in the above scheme are the result of the inventors' practice and careful study, so the process of discovering the above problems and the solutions proposed by the present disclosure in the following should be the contribution of the inventors to the present disclosure in the course of the present disclosure.

It should be noted that similar designations and letters indicate similar terms in the drawings below, so that once an item is defined in a drawing, it does not need to be further defined and explained in subsequent drawings.

It is understandable that before using the technical solutions disclosed in each embodiment of this disclosure, the type, scope of use, and use scenarios of any personal information involved in this disclosure shall be informed to the involved user and the user's authorization shall be obtained through appropriate procedures in accordance with relevant laws and regulations.

It should be noted that the specific terms mentioned in the embodiments of the present disclosure include: Kubernetes (K8s for short), which is an application software that is in open source and is used to manage container applications on the plurality of hosts in a cloud platform. The target of Kubernetes is to make the service cluster that is used for deploy distributed and containerized service simple and efficient.

In order to facilitate the understanding of the present embodiment, firstly, a service control method based on a service cluster disclosed in an embodiment of the present disclosure is introduced in detail. The execution subject of the service control method based on the service cluster provided in the embodiment of the present disclosure may be generally a terminal device or other processing device with a certain computing power, in which the terminal device may be a User Equipment (UE), a mobile device, a user terminal, a terminal, a Personal Digital Assistant (PDA), a handheld device, electronic device, etc. In some possible implementations, the service control method based on the service cluster can be implemented by a processor calling computer-readable instructions stored in a memory.

The following illustrates the service control method based on service clustering provided in the embodiment of the present disclosure by using an example where the executing subject is a server terminal.

As illustrated in FIG. 1, which is a flowchart of a service control method based on a service cluster provided in an embodiment of the present disclosure, the method may include the following steps.

S101: acquiring operation index information generated by a target service cluster when a task runs.

Here, the target service cluster may be a service cluster that is independently managed and controlled, which is used to process the Flink task matched with any one of data processing requirements. The target service cluster may include at least one service node, and the service node is used to process each sub-task under a Flink task. A Flink task can also be referred as to a Flink streaming job, which is used to indicate to perform data processing on the streaming data according to a data processing requirement.

A Flink task may correspond to at least one service cluster, and each service cluster may correspond to a Flink engine; i.e., each service cluster corresponding to a Flink task can be used to perform data processing on the streaming data according to the data processing requirement corresponding to the Flink task.

The target service cluster may also be any one of a plurality of service clusters. The plurality of service clusters may form a large-scale or even ultra-large-scale service cluster together, the plurality of service clusters may include the service clusters for processing one or more Flink task, and each service cluster may be deployed as a distributed cluster, which may include at least one service node.

For example, in the case where 100,000 service clusters exist for processing different Flink tasks, the target service cluster may be any one of the 100,000 service clusters.

For example, the operation index information is used to indicate that the engine operation index of the Flink engine in the target service cluster can reflect the cluster running situation when the target service cluster runs Flink tasks and the anomaly problems of the target service cluster in each dimension (i.e., each type of the runtime problem).

When implementing specifically, the service control method based on a service cluster provided in the embodiment of the present disclosure may be deployed in a control plane service that is independent of the Flink engine, and by triggering the control plane service, the anomaly detection and processing for the service cluster can be implemented by using the service control method based on the service cluster provided in the embodiment of the present disclosure. In order to implement the unified management and the control for large-scale service clusters, the above control plane service can be deployed and distributed in the plurality of service nodes, and each service node can independently run the control plane service. Because the control plane service in each service node may be a kind of stateless service and can be used to perform a multi-dimensional runtime anomaly detection and processing for any one of service clusters, the service node deployed with the control plane service can also be expanded according to the quantity of service clusters that need to be managed, so as to implement the adaptation to the scale of the service clusters that need to be managed. That is, because of statelessness, the control plane service can also flexibly complete the scaling-out and scaling-in, thereby implementing the simultaneous management and the control of the super-large scale service clusters corresponding to the super-large scale Flink tasks.

For example, for any one of the service nodes deployed with the control plane service, after the control plane service of the service node is triggered, the operation index information of the target service cluster when the task runs can be acquired.

In an embodiment, in order to implement that the control plane service can perform a multi-dimensional runtime anomaly detection on any one of service clusters in a large-scale service cluster in the case of statelessness, step S101 may further be implemented as the following:

receiving the first check request sent by the target service cluster, and in a case where (i.e., when) the first check request is used to request to perform a multi-dimensional runtime anomaly detection on the target service cluster, in response to the first check request, executing the acquiring operation index information generated by the target service cluster when the task runs.

Here, the first check request is used to request to perform a multi-dimensional runtime anomaly detection on the target service cluster, and the first check request may be a request that is actively generated and sent by the target service cluster.

For example, a timing trigger may be preset in the target service cluster, and the timing trigger can generate the first check request according to the preset detection period and send the first check request to the control plane service. In the case where the control plane service is configured in the plurality of service nodes, the first check request sent by the target service cluster can be sent to the control plane service corresponding to any one of the service nodes by using a load balancing strategy. Then, after the control plane service receives the first check request sent by the target service cluster, in the case where the control plane service can be determined to be used to request to perform a multi-dimensional runtime anomaly detection on the target service cluster, then in response to the first check request, the step of acquiring operation index information generated by a target service cluster when a task runs is executed.

Alternatively, step S101 may further be implemented as the following:

receiving the second check request sent by an operation and maintenance terminal, and in a case where the second check request is used to request to perform a multi-dimensional runtime anomaly detection on the target service cluster, in response to the second check request, executing the acquiring operation index information generated by the target service cluster when the task runs.

Here, in order to implement the flexibility of anomaly detection, the anomaly detection on the target service cluster can be implemented by using the approach of the check request that is sent by the operation and maintenance terminal. The second check request is the request that is actively sent by the operation and maintenance terminal.

For example, when the test person of the operation and maintenance terminal has a test requirement, the second check request for the target service cluster can be generated by using the operation and maintenance terminal and be sent to the control plane service. After receiving the second check request, in the case where the second check request is determined to be used to request to perform a multi-dimensional runtime anomaly detection on the target service cluster, in response to the second request, the step of acquiring operation index information generated by a target service cluster when a task runs can be executed.

In an embodiment, in order to implement the statelessness of the control plane service, the approach of independently storing the operation index information of the service cluster can be adopted. When the anomaly situation analysis is determined to be performed, the control plane service can acquire the operation index information from the index database in the preset index storage system. Therefore, step S101 may be implemented as the following:

acquiring operation index information corresponding to the target service cluster during an execution time period from an index database corresponding to the target service cluster, wherein the index database is used to dynamically maintain the operation index information generated when the target service cluster executes the task.

Here, the preset index database can dynamically maintain the operation index information generated when each service cluster executes a task, and each service cluster can actively send the operation index information generated when the Flink engine executes a corresponding Flink task to the index database for storage. The execution time is the time when the target service cluster executes the Flink task.

In response to the received first check request or second check request, the control plane service can acquire the operation index information of the target service cluster in the corresponding execution time from the index database.

Moreover, after acquiring the operation index information corresponding to the target service cluster from the index database, the operation index information may also be preprocessed to obtain an operation index information that conforms to the model input for the strategy model.

Here, the operation index information, which is related to the target service cluster acquired from the index database, may not be directly taken as the input information of the strategy model in the following description, so the operation index information needs to be preprocessed. The preprocessing operations may include, for example, changing the data format of the data in the operation index information, performing secondary aggregation on the data in the operation index information, etc. Optionally, the index database can store a large amount of index information related to the target service cluster, so when implementing specifically, the operation index information corresponding to the target service cluster in the execution time can be selectively acquired, in which the operation time may be, for example, past 15 minutes, 20 minutes, or 1 hour.

When implementing specifically, after acquiring the operation index information of the target service cluster in the corresponding execution time from the index database, a series of preprocessing can be performed on the operation index information, so as to obtain the operation index information that conforms to the model input of the strategy model.

Optionally, the preprocessing operation may also include the operation of dividing the operation index information. Specifically, the operation index information can be divided into pieces of sub-index information matched with strategy models respectively. For example, the operations such as the data format conversion and the data secondary aggregation can be performed on the operation index information acquired from the index database to obtain the operation index information after the first processing. Then, the operation index information after the first processing can be divided into pieces of sub-index information matched with strategy models, respectively. Each sub-index information can be taken as the operation index information that the strategy model can identify.

Thus, the operation index information matched with the input of the strategy model can be obtained by preprocessing the operation index information acquired from the index database, and then the strategy model is used to perform identification processing on the operation index information, and the accurate identification result can be obtained.

S102: calling one or more strategy models in a strategy model library to perform anomaly analysis on the operation index information, and determining target anomaly information of an anomaly occurring in the target service cluster when the task runs and a corresponding target solution strategy, wherein the strategy model library is used to maintain the one or more strategy models, and each strategy model is used to analyze an anomaly situation in a certain dimension that exists in the target service cluster when the task runs, and formulate a solution strategy for the anomaly situation, and different strategy models respectively have an ability of analyzing anomaly situations in different dimensions and formulating corresponding solution strategies.

Here, for example, the strategy model library is a preset model library, in which a plurality of strategy models can be maintained. The strategy model is used to analyze the anomaly situation of the operation index information in a certain dimension and provide the solution strategy for the analyzed anomaly situation. Each strategy model is generated according to a runtime problem that may occur in a certain dimension of the service cluster. Specifically, the anomaly situations of each dimension that may occur when the service cluster executes an Flink task can be determined in advance, and then, for the anomaly situations of each dimension, the cluster management strategy corresponding to the anomaly situation can be formulated. Afterwards, for each cluster management strategy, the strategy model that is deployed with the cluster management strategy can be generated. The anomaly dimension that can be analyzed by a strategy model is determined according to the dimension corresponding to the runtime problem that the strategy model depends on when the strategy model is generated. Different strategy models can have the ability of analyzing anomaly situations in different dimensions and formulating the corresponding solution strategies. Specifically, for any strategy model, the strategy model can be used to analyze the anomaly situation in a certain dimension that exists in the service cluster when the task runs and formulate the solution strategy for the anomaly situation.

For example, anomaly situations in various dimensions may include the anomaly situation in a resource dimension, the anomaly situation in a node dimension, the anomaly situation in an external service dimension, and the like. The anomaly situation in a resource dimension is the situation where the change in traffic causes the job resources to be insufficient/excessive, the anomaly situation in a node dimension is the situation where the "slow node" is called because the change in the node operating environment causes the node processing performance to decrease, and the anomaly situation in an external service dimension is the situation where the external service anomaly causes an operation error. The cluster management strategy may include the auto-scaling strategy that is formulated according to the situation of the insufficient/excessive job resources in the above-mentioned resource dimension, the auto-migration strategy of the slow node that is formulated according to the situation of "slow node" in the node dimension, or the anomaly detection control strategy that is formulated according to the problem of the external service anomaly in the external service dimension. Therefore, the strategy model library may include an auto-scaling model that is deployed with the auto-scaling strategy, a slow node detection model that is deployed with the slow node auto-migration strategy, or an anomaly diagnosis model that is deployed with the anomaly detection control strategy. The auto-scaling model is used to analyze the anomaly situation in the resource dimension and formulate the solution strategy, the slow node detection model is used to analyze the anomaly situation in the node dimension and formulate the solution strategy, and the anomaly diagnosis model is used to analyze the anomaly situation in the external service dimension and formulate the solution strategy.

The target anomaly information is the anomaly situation that is detected for the target service cluster, i.e., the runtime problem existing in the target service cluster. The target solution strategy is a strategy for solving the target anomaly information. The target solution strategy includes that configuration information that needs to be modified by the target service cluster. After modifying the configuration information is completed, the target anomaly information corresponding to the target service cluster can be solved. Different target solution strategies are used to solve the anomaly situations in different dimensions.

When implementing specifically, after obtaining the operation index information, one or more strategy models in the strategy model library can be called to perform anomaly analysis on the operation index information, and the anomaly analysis results output by each strategy model are obtained. Because different strategy models correspond to the anomaly situations in different dimensions, and the target service cluster may not have any anomaly information or have some types of anomaly information, not all the strategy models can output the anomaly analysis result including the anomaly situation, and some strategy models may output the anomaly analysis result that indicates no anomaly. For the strategy model that can output the anomaly analysis result including the anomaly situation, the strategy model can also output the corresponding solution strategy when outputting the anomaly situation.

After obtaining the anomaly analysis result output by each strategy model, the anomaly situation indicated by the anomaly analysis result existing an anomaly situation can be taken as the target anomaly information, and the solution strategy indicated in the anomaly analysis result can be taken as the target solution strategy.

For example, the auto-scaling model, the slow node detection model, and the anomaly diagnosis model can be used to perform anomaly analysis in corresponding dimension on the operation index information, and the anomaly analysis results output by each model are obtained. For example, in the case where the operation index information indicates that the target service cluster has the problem of insufficient node resources and the problem of slow nodes, the anomaly analysis result output by the auto-scaling model can be the node resource that is insufficient and the corresponding scaling-out strategy; the anomaly analysis result output by the slow node detection model can be the slow node problem and the node migration strategy; and the anomaly analysis result output by the anomaly diagnosis model can be no anomaly. Then, according to the anomaly analysis results output by the auto-scaling model and the slow node detection model respectively, the target anomaly information can be determined to include the problem of insufficient node resources and the problem of slow nodes, and the target solution strategy can include the scaling-out strategy corresponding to the problem of insufficient node resources and the node migration strategy corresponding to the problem of slow nodes.

Thus, different strategy models can be used to abstract the implementation of the cluster management strategy to support the rapid expansion of the cluster management strategy for anomaly situations (i.e., runtime problems) in different dimensions, thereby solving the different runtime problems of Flink tasks in one stop.

In an embodiment, in order to support the strong functional expansibility of the control plane service (i.e., in order to flexibly expand different strategy models and increase the cluster management strategy), the process of the anomaly situation detection and the strategy formulation can be abstracted as being implemented by using a controller. The controller may include an index acquiring and preprocessing part, a model part and a configuration changing executor part. The index acquiring and preprocessing part is configured to acquire index information and preprocess the acquired index information, the model part may select the strategy models deployed with different cluster management strategies in the strategy model library, and the configuration changing executor part will be illustrated in detail hereinafter. Specifically, the control plane service can use the index acquiring part of the controller to acquire the operation index information, and then in the model part, the control plane service can respectively call different strategy models in the strategy model library to perform anomaly analysis in different dimensions on the operation indicator information, and obtain the anomaly analysis results output by the strategy models. Finally, according to the anomaly analysis results, the target anomaly information existing in the target service cluster when the task runs and the corresponding target solution strategy can be determined.

S103: sending a configuration updating indication carrying the target solution strategy to the target service cluster, in which the configuration updating indication is used to indicate the target service cluster to modify configuration information of the target service cluster according to the target solution strategy.

Here, the target solution strategy can be used to indicate the configuration information that the target service cluster needs to modify and the modification method, and the configuration updating indication includes the information generated by the target solution strategy.

When implementing specifically, after determining the target solution strategy, a configuration updating indication carrying the target solution strategy can be generated, and the configuration updating indication is sent to the target service cluster. Optionally, a configuration updating indication carrying the target solution strategy and the target anomaly information can also be generated and sent to the target service cluster. The step of sending the configuration updating indication to the target service cluster may be executed by the configuration changing executor in the controller.

After receiving the configuration updating indication, the Flink engine in the target service cluster can modify the current configuration information of the target service cluster according to the target solution strategy in the configuration updating indication, and obtain a service cluster after modifying. The service cluster after modifying can solve the anomaly situation corresponding to the target anomaly information, thereby making the target service cluster return to normal.

In an embodiment, in order to implement the completion of modifying of the configuration information without restarting the Flink task, so as to solve the anomaly problem corresponding to the target anomaly information, above step S103 may also be implemented as the following steps:

S103-1: according to a strategy type to which the target solution strategy belongs, determining a target interface matched with the strategy type from a plurality of configuration modification interfaces corresponding to the target service cluster, wherein different configuration modification interfaces are used to call different configuration modification functions, and the different configuration modification functions are preset according to the anomaly situations in different dimensions.

Here, the strategy type is related to the dimension to which the anomaly situation that can be solved by the target solution strategy. For example, the strategy type may include the resource type related to a resource dimension, the node type related to a node dimension, the external service type related to an external service dimension, and the like. Specifically, the resource configuration changing requirements corresponding to different strategy types can be abstracted in advance, and the configuration modification functions corresponding to resource configuration changing requirements can be written in advance, and each configuration modification function is used to modify the cluster configuration information matched with the corresponding resource configuration changing requirement.

For example, the resource configuration changing requirements may include a resource scaling requirement, a slow node migration requirement, a service anomaly processing requirement and the like. The configuration modification functions may include a resource scaling function corresponding to the resource scaling requirement, a slow node migration function corresponding to the slow node migration requirement for migrating cluster service nodes, and a service anomaly processing function corresponding to the service anomaly processing requirement. The resource scaling function is used to modify the cluster configuration information related to the quantity of the cluster resource nodes; the slow node migration function is used to modify the cluster configuration information related to the node migration; and the service anomaly processing function is used to modify the cluster configuration information related to external service anomalies. Each configuration modification function is allocated with a corresponding configuration modification interface on the Flink engine side corresponding to the target service cluster, and the interface can be used to call the corresponding configuration modification function.

For example, the configuration modification interface may be an idle application programming interface (API). The resource scaling function can correspond to a scaling capacity API, the slow node migration function can correspond to a slow node migration API, and the service anomaly processing function can correspond to a service anomaly processing API.

The target interface is the configuration modification interface matched with the strategy type to which the target solution strategy belongs, and the target interface can call the target configuration modification function used to modify the cluster configuration information. For example, in the case where the target interface is a scaling API, the target interface can call the resource scaling function.

When implementing specifically, according to the anomaly dimension related to the strategy type to which the target solution strategy belongs, the corresponding target resource configuration changing requirement can be determined. Then, according to the target resource configuration changing requirement, the target interface allocated with the configuration modification function corresponding to the target resource configuration changing requirement can be determined from the plurality of the configuration modification interfaces corresponding to the target service cluster.

S103-2: sending the configuration updating indication to the target service cluster through the target interface, and calling a target configuration modification function matched with the target interface, in which the target service cluster is configured to use the target configuration modification function that is called, and modify the configuration information of the target service cluster according to the target solution strategy carried in the configuration updating indication.

When implementing specifically, the configuration changing executor in the controller can send a configuration updating indication to the Flink engine of the target service cluster through the target interface, and can call the target configuration modification function through the target interface. Then the Flink engine can use the called target configuration modification function to modify the configuration information of the target service cluster according to the target solution strategy carried in the configuration updating indication, so as to obtain the service cluster after modifying, thereby solving the anomaly situation corresponding to the target anomaly information.

For example, in the case where the target solution strategy is the scaling strategy, the target interface can be determined to be the scaling API. The configuration changing executor can send a configuration updating indication to the Flink engine of the target service cluster through the scaling API, and simultaneously call the resource scaling function corresponding to the scaling API. Then, the Flink engine can use the called resource scaling function to perform scaling processing on the target service cluster according to the target solution strategy carried in the configuration updating indication.

Thus, by the configuration modification interfaces corresponding to each configuration modification function that is written in advance, the completion of modifying the configuration information of the target service cluster can be implemented without restarting the Flink task. Moreover, the separation of the cluster management strategy and the implementation of configuration changing can be implemented, by using the strategy models in the strategy model library to perform anomaly detection, and using the configuration changing executor to help the target service cluster to implement the configuration changing.

Figure 2:
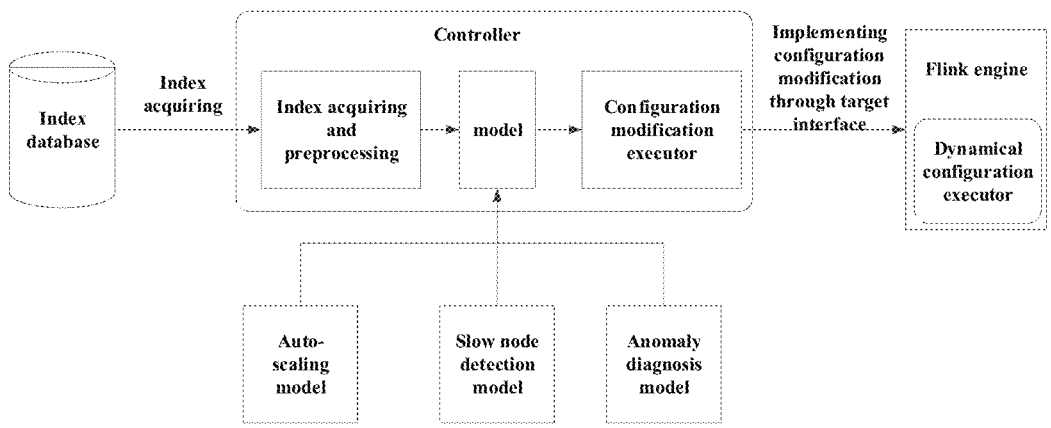
FIG. 2 illustrates an interaction schematic diagram of a service control method based on a service cluster provided by an embodiment of the present disclosure.

As illustrated in FIG. 2, which is an interaction schematic diagram of a service control method based on a service cluster provided in an embodiment of the present disclosure, the index acquiring and preprocessing part in the controller of the control plane service can acquire the operation index information generated by the target service cluster when the task runs from the index database, and obtain the operation index information that conforms to the model input by preprocessing the operation index information. Then, one or more strategy models in the strategy model library plugged by the model part can be used to perform anomaly analysis on the operation index information, and determine the target anomaly information existing in the target service cluster when the task runs and the corresponding target solution strategy. The pluggable strategy models illustrated in FIG. 2 include the auto-scaling model, the slow node detection model and the anomaly diagnosis model. Then, the configuration changing executor can be used to send the configuration updating indication that carries the target solution strategy to the target service cluster through the target interface, so that the Flink engine of the target service cluster can modify the cluster configuration according to the target solution strategy by using the dynamic configuration changer and using the target configuration modification function corresponding to the target interface that is called, so as to make the target service cluster return to normal.

In an embodiment, in order to avoid global emergencies in the service cluster (for example, the data disorder of a dependency timing library, the large-scale operation anomaly in disaster recovery, etc.), a global flow restrictor can also be set for the control plane service to implement the interception of the sudden anomalies in a short time period.

Specifically, step S103 may be implemented as the following step:
determining a total quantity of solution strategies that have been generated in a preset historical period; and in the case where the total quantity is less than a preset quantity, sending the configuration updating indication carrying the target solution strategy to the target service cluster.

Here, the time length corresponding to the preset historical time period can be set according to experience, which is not specifically limited in the embodiments of the present disclosure. The preset quantity can also be set according to experience, which is also not specifically limited here. The solution strategies that have been generated can be the solution strategies generated by the target service cluster in a preset historical period, and can also be the solution strategies generated by service clusters that performs Flink tasks in the preset historical period.

When implementing specifically, after determining the target solution strategy, the total quantity of the solution strategies that have been generated in a preset historical period can be determined. Then, the magnitude relationship between the total quantity and the preset quantity can be judged by using the global flow restrictor set, and whether the configuration updating indication is generated and sent can be controlled according to the magnitude relationship. Specifically, in the case where the total quantity is less than the preset quantity, it can be determined that a large number of sudden anomalies do not exist in a short time period, then the configuration updating indication carrying the target solution strategy can be generated, and the indication can be sent to the target service cluster through the target interface. On the contrary, in the case where the total quantity is larger than or equal to the preset quantity, it can be determined that a large number of sudden anomalies exist in a short time period, then the target solution strategy can be ignored, and the configuration updating indication carrying the target solution strategy cannot be sent to the target service cluster.

In an embodiment, step S102 may further be implemented as the following steps:
S102-1: calling the one or more strategy models in the strategy model library to perform anomaly analysis on the operation index information, and obtaining an anomaly analysis result output by each strategy model.

Here, the anomaly analysis result may include an analysis result indicating that there is no anomaly, or an analysis result including a specific anomaly situation and a corresponding solution strategy.

For example, any strategy model in the strategy model library can be called to perform anomaly analysis on the operation index information to obtain the anomaly analysis result. Alternatively, the strategy models in strategy model library can be called, in which the strategy models may include an auto-scaling model, a slow node detection model, an anomaly diagnosis model and the like. Then, the called auto-scaling model can be used to perform anomaly analysis in resource dimension on the operation index information according to the auto-scaling strategy, and the first anomaly analysis result in resource dimension can be obtained; the called slow node detection model is used to perform anomaly analysis under node dimension on the operation index information according to the slow node auto-migration strategy, and the second anomaly analysis result under the node dimension is obtained; and the called diagnosis model can be used to perform anomaly analysis in an external service dimension on the operation index information according to the anomaly detection control strategy, and the third anomaly analysis result under the external service dimension is obtained. The strategy models called can perform anomaly analysis synchronously or asynchronously.

In an embodiment, step S102-1 may be implemented as the following steps:
Step 1: for any one of the strategy models that are called, using the strategy model to acquire execution condition information of the target service cluster when the task runs and strategy configuration information corresponding to the strategy model from a preset target database, wherein the target database is used to dynamically maintain the execution condition information set for each service cluster and the strategy configuration information set for each strategy model.

Here, the target database is a preset database that is used to store configuration information. Specifically, the target database can be used to dynamically maintain the execution condition information set for each service cluster and the strategy configuration information set for each strategy model.

The execution condition information is used to indicate the processing condition information related to processing streaming data that the target service cluster depends on when executing the Flink task. The execution condition information may include at least one task execution condition. For example, the two task execution conditions included in the execution condition information may be the operation logic condition of streaming data processing and the resource specification condition of each service node in the target service cluster.

The strategy configuration information is used to configure the cluster management strategy that is deployed by the strategy model. For example, the strategy configuration information may include the resource utilization rate of a cluster, the time interval between two scaling-out behaviors, the mode of the slow node migration, etc.

Specifically, the execution condition information corresponding to each service cluster can be preset, and the execution condition information of each service cluster is stored in the target database of the configuration information storage system in advance. Simultaneously, the strategy configuration information corresponding to each strategy model can be preset, and each strategy configuration information is also stored in the target database in advance. Then, when determining that the anomaly detection and processing is needed, the strategy model can acquire the execution condition information corresponding to the target service cluster and acquire the strategy configuration information corresponding to the strategy model from the target database.

Step 2: according to each task execution condition indicated by the execution condition information, judging whether the operation index information indicates that the target service cluster has the anomaly situation.

When implementing specifically, the strategy model can perform anomaly analysis and detection on the operation index information according to each task execution condition indicated by the acquired execution condition information and the deployed cluster management strategy, and determine whether the operation index information has an anomaly situation, i.e., judge whether the operation index information indicates that the target service cluster has an anomaly situation. For example, it is judged whether the operation index information satisfies the task execution condition and the cluster management strategy. In response to the target service cluster having the anomaly situation, Step 3 below is executed; otherwise, the anomaly analysis result indicating that there is no anomaly situation can be output.

Step 3: in response to the target service cluster having the anomaly situation, according to the strategy configuration information, formulating the solution strategy for the anomaly situation existing in the target service cluster, and taking the anomaly situation and the solution strategy as the output anomaly analysis result.

When implementing specifically, in the case where the strategy model determines that the operation index information indicates that an anomaly situation exists, then the cluster management strategy deployed by the strategy model can be configured according to the strategy configuration information after determining the specific anomaly situation, and the cluster management strategy is obtained after configuring, and then a solution strategy for the anomaly situation is generated by using the cluster management strategy after configuring. Then, the anomaly situation determined by the strategy model and the generated solution strategy can be output as the anomaly analysis result.

Figure 3:
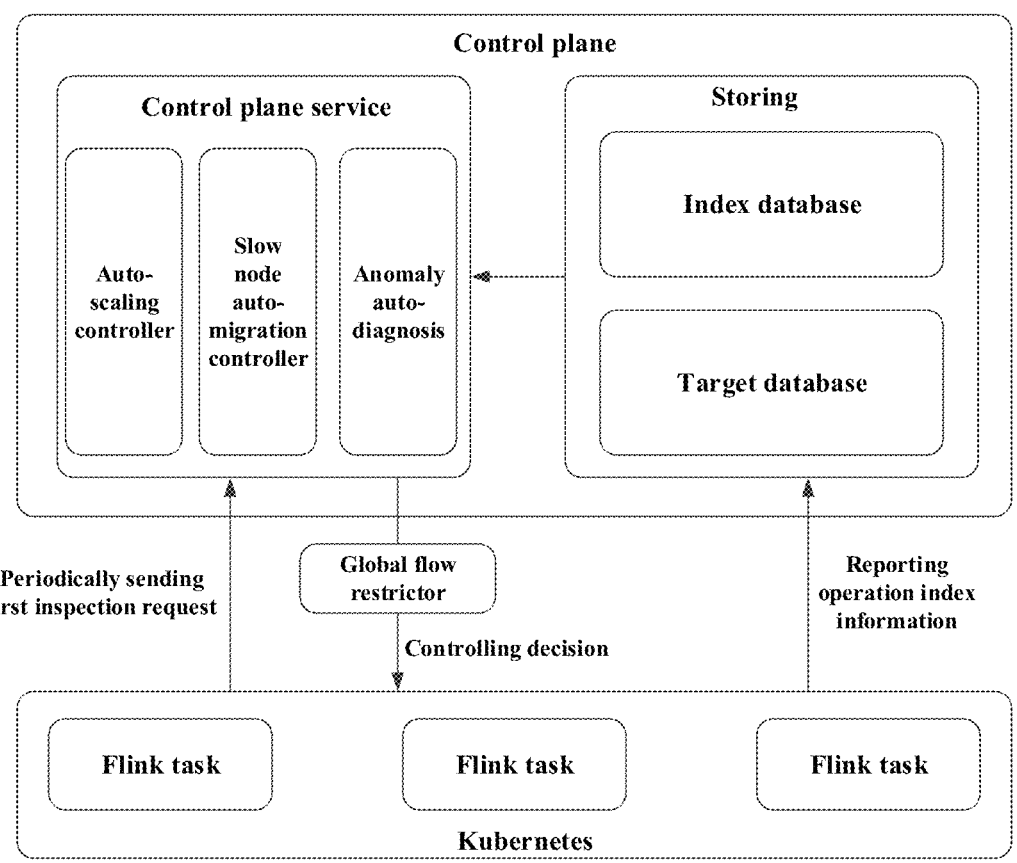
FIG. 3 illustrates an interaction schematic diagram of another service control method based on service cluster provided in an embodiment of the present disclosure.

As illustrated in FIG. 3, which is an interaction schematic diagram of another service control method based on a service cluster provided in an embodiment of the present disclosure, the service cluster executing any Flink task can report the operation index information generated when executing the Flink task to the index database for storage. The target service cluster may also periodically send the first check request to the control plane service. The target service cluster may be any service cluster in Kubernetes. In response to the first check request, the control plane service can use the controller in the strategy model (such as an auto-scaling controller, a slow node auto-migration controller or an anomaly auto-diagnosis controller) to acquire the operation index information from the index database, and acquire the execution condition information corresponding to the target service cluster and the strategy configuration information corresponding to the strategy model from the target database. Then, based on the obtained strategy configuration information and execution condition information, the strategy model can be used to perform anomaly analysis on the acquired operation index information to determine the anomaly situation and the corresponding target solution strategy. Then, the global flow restrictor is used to make the control decision, i.e., in the case where the total quantity of the solution strategies that have been generated in a preset historical period is determined to be less than the preset quantity, the configuration updating indication carrying the target solution strategy is sent to the target service cluster, so that the target service cluster adjusts the configuration information according to the target solution strategy, thereby returning to normal.

In an embodiment, for the situation that the target service cluster has surplus operation resources and needs to perform scaling-in processing, above Step 3 may be implemented as the following:

P1: acquiring historical state information of the target service cluster in the case where the anomaly situation is that cluster resources are larger than target resources required when the task runs, wherein the historical state information is used to indicate resource node quantities of the target service cluster in different time periods.

Here, the cluster resources are the total processing resources that the target service cluster can provide, and the target resources are the maximum amount of resources required to execute the Flink task. In the case where the cluster resources are larger than the target resources, it can be illustrated that the target service cluster has the problem of excessive resources.

The historical state information may specifically include the resource node quantity of the target service cluster in each time period in the past. Optionally, the historical state information may indicate the corresponding resource node quantity each time when the target service cluster performs scaling-out and scaling-in in the past time.

When implementing specifically, in the case where the auto-scaling model is used to determine that the anomaly situation existing in the target service cluster is that the cluster resources are larger than the target resources, then the historical state information of the target service cluster can be acquired.

P2: determining the first resource node quantity in a target time period from resource node quantities indicated by the historical state information.

Here, the target time period may be a preset time period, and the time period may be the peak period of streaming data generation, for example, the target time period may be from 9:00 to 12:00 every night.

When implementing specifically, the first resource node quantity in the target time period can be determined from resource node quantities indicated by the historical state information. In the case where the historical state information includes the resource node quantities in the plurality of target time periods (for example, the resource node quantities corresponding to 9:00 to 12:00 every night in the past days), then the minimum resource node quantity in the resource node quantities in the plurality of target time periods can be taken as the first resource node quantity.

P3: determining a target resource node quantity according to the first resource node quantity and a second resource node quantity required for providing the target resources.

Here, the second resource node quantity can be determined according to the target resources and the resources that each resource node (i.e., service node) in the target service cluster can provide.

When implementing specifically, in the case where the first resource node quantity is larger than the second resource node quantity, the first resource node quantity can be taken as the target resource node quantity. In the case where the first resource node quantity is less than or equal to the second resource node quantity, the second resource node quantity can be taken as the target resource node quantity.

P4: formulating the solution strategy for the anomaly situation according to the strategy configuration information, wherein the solution strategy is used to indicate that an original resource node quantity corresponding to the cluster resources is reduced to the target resource node quantity.

Here, the original resource node quantity is the resource node quantity corresponding to the current cluster resources of the target service cluster.

For example, in the case where the target service cluster is determined to have excessive resources, the auto-scaling model can be used to generate a scaling-in strategy matched with the scaling time interval and the resource utilization rate, according to the resource utilization rate and the scaling time interval indicated by the strategy configuration information, and according to the auto-scaling strategy deployed by the auto-scaling model. The scaling-in strategy is used to indicate to reduce the original resource node quantity to the target resource node quantity. For example, in the case where the resource utilization rate is X %, the scaling-in strategy may be reducing the original resource node quantity to the target resource node quantity after XX time, and the X represents a number.

Thus, in the case where the target service cluster is determined to implement the scaling-in strategy, the first resource node quantity in the target time period is used to determine the target resource node quantity, which can ensure that, after the target service cluster executes scaling-in according to the target solution strategy, the resource nodes of the target resource node quantity in the target service cluster can ensure that the target service cluster can smoothly pass the peak period of the streaming data generation.

S102-2: based on the anomaly analysis result and a priority corresponding to each strategy model, selecting an anomaly analysis result, which has a highest priority and characterizes the anomaly existing, as a target anomaly analysis result, wherein the target anomaly analysis result includes the target anomaly information and the corresponding target solution strategy.

Here, the priority of each strategy model can be specified in advance. For example, in the case where the plurality of strategy models in the strategy model library include an auto-scaling model, a slow node detection model, and an anomaly diagnosis model, the auto-scaling model can have the first priority, the anomaly diagnosis model can have the second priority, and the slow node detection model can have the third priority.

When implementing specifically, in the case where a strategy model is called, in response to the anomaly analysis result output by the strategy model characterizing the anomaly existing, then the anomaly analysis result is taken as the target anomaly analysis result. The anomaly situation in the target anomaly analysis result can be taken as the target anomaly information, and the solution strategy in the target anomaly analysis result can be taken as the target solution strategy. In response to the anomaly analysis result output by the strategy model characterizing no anomaly, then other strategy models can be used to perform the anomaly detection, or the target service cluster can be directly determined that no anomaly exists.

In the case where the plurality of strategy models are called, after obtaining the anomaly analysis results output by each strategy model, the anomaly analysis result that indicates the anomaly existing can be determined first. When there is only one anomaly analysis result that indicates the anomaly existing, the anomaly analysis result can be directly taken as the target anomaly analysis result. The anomaly situation in the target anomaly analysis result can be taken as the target anomaly information, and the solution strategy in the target anomaly analysis result can be taken as the target solution strategy.

When there are the plurality of anomaly analysis results that indicate the anomaly existing, i.e., it can be determined that the plurality of strategy models output anomaly analysis results that indicate the anomaly existing, so the anomaly analysis result output by the strategy model with the highest priority can be taken as the target anomaly analysis result according to the priorities of the strategy models. The anomaly situation in the target anomaly analysis result can be taken as the target anomaly information, and the solution strategy in the target anomaly analysis result can be taken as the target solution strategy.

For example, the first anomaly analysis result is that the operation resources are insufficient and the second anomaly analysis result is that a particular node is a slow node, then the first anomaly analysis result output by the auto-scaling model with the highest priority can be taken as the target anomaly analysis result.

Optionally, after sending a configuration updating indication carrying the target solution strategy in the target anomaly analysis result to the target service cluster, and after the target service cluster changes the configuration information according to the target solution strategy, it can be continued that, according to the priorities, the target solution strategies corresponding to the anomaly analysis results output by the strategy models with other priorities are sent to the target service cluster by using the configuration updating indication, so as to implement the solutions of other anomaly situations in time.

Based on the above-mentioned embodiments, by acquiring operation index information generated by a target service cluster when a task runs, and using one or more strategy models that have the ability to analyze and solve different anomaly situations of the service cluster to perform anomaly analysis on the operation index information, the analysis and detection of one or more types of runtime problems (i.e., anomaly situations in a certain dimension) for the target service cluster can be implemented, and the target anomaly information that may exist in the target service cluster can be determined quickly and accurately, and a corresponding target solution strategy can be provided. By sending a configuration updating indication carrying the target solution strategy to the target service cluster, the service control of the target service cluster can be implemented, and then the target service cluster can be indicated to modify the cluster configuration information in time according to the target solution strategy, which improves the efficiency of dealing with the target anomaly information. Moreover, the detection of each type of runtime problem that may exist in the target service cluster can be implemented through the plurality of strategy models maintained in the strategy model library, which improves the comprehensiveness of problem detection. Because each strategy model can also provide the target solution strategy for the target anomaly information, each type of runtime problems can be solved uniformly by using each strategy model. At the same time, the above-mentioned process of performing anomaly analysis on the target service cluster and processing the target anomaly information, is a completely automatic process without manual participation, and therefore, the consumption of human resources can be avoided, and the speed of anomaly detection and the efficiency of solving the anomaly can be improved. In addition, because the target service cluster may be any service cluster of the plurality of service clusters, and the plurality of strategy models can implement the detection and solution of the anomaly situations in each dimension, the service control method based on the service cluster provided in the embodiments of the present disclosure can implement the unified management of large-scale service clusters, and implement the timely detection and solution of each anomaly situation that may exist in each service cluster in the large-scale service cluster.

Those skilled in the art may understand that in the above-mentioned method of the specific embodiment, the order of writing each step neither implies a strict order of execution nor constitutes any limitation on the implementation process, and the specific order of execution of each step shall be determined by its function and possible internal logic.

Based on the same concept, an embodiment of the present disclosure also provides a service control apparatus based on a service cluster corresponding to the service control method based on the service cluster, and because the principle of solving the problem by the apparatus in the embodiment of the present disclosure is similar to the service control method based on the service cluster described above in the embodiments of the present disclosure, the embodiment of the apparatus can be referred to the implementation of the method, and the description will not be repeated.

Figure 4:
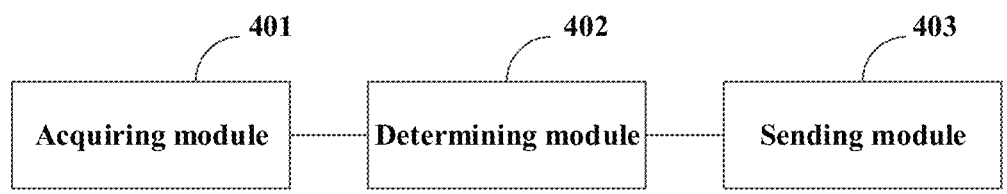
FIG. 4 illustrates a schematic diagram of a service control apparatus based on a service cluster provided by an embodiment of the present disclosure.

As illustrated in FIG. 4, which is a schematic diagram of a service control apparatus based on a service cluster provided by an embodiment of the present disclosure, the service control apparatus includes an acquiring module 401, a determining module 402, and a sending module 403.

The acquiring module 401 is configured to acquire operation index information generated by a target service cluster when a task runs.

The determining module 402 is configured to call one or more strategy models in a strategy model library to perform anomaly analysis on the operation index information, and determine target anomaly information of an anomaly occurring in the target service cluster when the task runs and a corresponding target solution strategy. The strategy model library is used to maintain the one or more strategy models, and each strategy model is used to analyze an anomaly situation in a certain dimension that exists in the target service cluster when the task runs, and formulate a solution strategy for the anomaly situation. The different strategy models respectively have an ability of analyzing anomaly situations in different dimensions and formulating corresponding solution strategies.

The sending module 403 is configured to send a configuration updating indication carrying the target solution strategy to the target service cluster. The configuration updating indication is used to indicate the target service cluster to modify configuration information of the target service cluster according to the target solution strategy.

In a possible embodiment, when sending a configuration updating indication carrying the target solution strategy to the target service cluster, the sending module 403 is further configured to:

according to a strategy type to which the target solution strategy belongs, determine a target interface matched with the strategy type from a plurality of configuration modification interfaces corresponding to the target service cluster; in which different configuration modification interfaces are used to call different configuration modification functions, and the different configuration modification functions are preset according to the anomaly situations in different dimensions; and send the configuration updating indication to the target service cluster through the target interface, and call a target configuration modification function matched with the target interface; in which the target service cluster is configured to use the target configuration modification function that is called, and modify the configuration information of the target service cluster according to the target solution strategy carried in the configuration updating indication.

In a possible embodiment, when sending a configuration updating indication carrying the target solution strategy to the target service cluster, the sending module 403 is further configured to:

determine a total quantity of solution strategies that have been generated in a preset historical period; and in the case where the total quantity is less than a preset quantity, send the configuration updating indication carrying the target solution strategy to the target service cluster.

In a possible embodiment, when acquiring operation index information generated by the target service cluster when the task runs, the acquiring module 401 is further configured to:

receive the first check request sent by the target service cluster, and in the case where the first check request is used to request to perform a multi-dimensional runtime anomaly detection on the target service cluster, then in response to the first check request, execute the acquiring operation index information generated by the target service cluster when the task runs; or receive the second check request sent by an operation and maintenance terminal, and in the case where the second check request is used to request to perform a multi-dimensional runtime anomaly detection on the target service cluster, then in response to the second check request, execute the acquiring operation index information generated by the target service cluster when the task runs.

In a possible embodiment, when acquiring operation index information generated by the target service cluster when the task runs, the acquiring module 401 is further configured to:

acquire operation index information corresponding to the target service cluster during an execution time period from an index database corresponding to the target service cluster; in which the index database is used to dynamically maintain the operation index information generated when the target service cluster executes the task.

In a possible embodiment, when calling one or more strategy models in a strategy model library to perform anomaly analysis on the operation index information, and determining target anomaly information of an anomaly occurring in the target service cluster when the task runs and a corresponding target solution strategy, the determining module 402 is further configured to:
- call one or more strategy models in the strategy model library to perform anomaly analysis on the operation index information, and obtain an anomaly analysis result output by each strategy model; and
- based on the anomaly analysis result and a priority corresponding to each strategy model, select an anomaly analysis result that has a highest priority and characterizes the anomaly existing as a target anomaly analysis result, in which the target anomaly analysis result includes the target anomaly information and the corresponding target solution strategy.

In a possible implementation, when calling the one or more strategy models in the strategy model library to perform anomaly analysis on the operation index information, and obtaining an anomaly analysis result output by each strategy model, the determining module 402 is further configured to:
- for any one of the strategy models that are called, use the strategy model to acquire execution condition information of the target service cluster when the task runs and strategy configuration information corresponding to the strategy model from a preset target database; in which the target database is used to dynamically maintain the execution condition information set for each service cluster and the strategy configuration information set for each strategy model;
- according to each task execution condition indicated by the execution condition information, judge whether the operation index information indicates that the target service cluster has the anomaly situation; and
- in response to the target service cluster having the anomaly situation, according to the strategy configuration information, formulate the solution strategy for the anomaly situation existing in the target service cluster, and take the anomaly situation and the solution strategy as the output anomaly analysis result.

In a possible implementation, when formulating the solution strategy for the anomaly situation existing in the target service cluster according to the strategy configuration information, the determining module 402 is further configured to:
- acquire historical state information of the target service cluster in a case where the anomaly situation is that cluster resources are larger than target resources required when the task runs; in which the historical state information is used to indicate resource node quantities of the target service cluster in different time periods;
- determine the first resource node quantity in a target time period from resource node quantities indicated by the historical state information;
- determine a target resource node quantity according to the first resource node quantity and the second resource node quantity required for providing the target resources; and
- formulate the solution strategy for the anomaly situation according to the strategy configuration information; in which the solution strategy is used to indicate that an original resource node quantity corresponding to the cluster resources is reduced to the target resource node quantity.

The description of the processing flow of each module in the device and the interaction flow between the modules can refer to the relevant description in the above method embodiment, and the description is not repeated in detail here.

Figure 5:
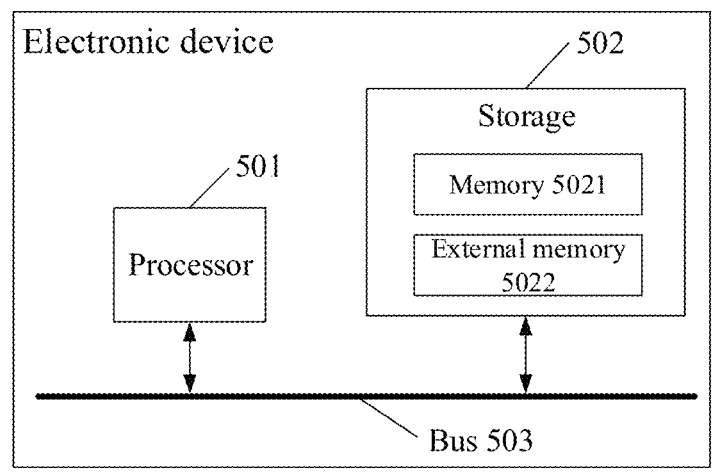
FIG. 5 illustrates a structural schematic diagram of an electronic device provided by an embodiment of the present disclosure.

Based on the same technical conception, an embodiment of the present disclosure also provides an electronic device. FIG. 5 is a structural schematic diagram of an electronic device provided in the embodiment of the present disclosure.

The electronic device includes at least one processor 501, a memory 502 and a bus 503. The memory 502 stores machine-readable instructions that can be executed by the processor 501, and the processor 501 is used for executing the machine-readable instructions stored in the memory 502. When the machine-readable instructions are executed by the processor 501, the processor 501 executes the following steps:
- S101: acquiring operation index information generated by a target service cluster when a task runs;
- S102: calling one or more strategy models in a strategy model library to perform anomaly analysis on the operation index information, and determining target anomaly information of an anomaly occurring in the target service cluster when the task runs and a corresponding target solution strategy, wherein the strategy model library is used to maintain the one or more strategy models, and each strategy model is used to analyze an anomaly situation in a certain dimension that exists in the target service cluster when the task runs, and formulate a solution strategy for the anomaly situation, wherein different strategy models respectively have an ability of analyzing anomaly situations in different dimensions and formulating corresponding solution strategies; and
- S103: sending a configuration updating indication carrying the target solution strategy to the target service cluster, wherein the configuration updating indication is used to indicate the target service cluster to modify configuration information of the target service cluster according to the target solution strategy.

For example, the memory 502 includes a memory 5021 and an external memory 5022. The memory 5021 herein is also called an internal memory and is used for temporarily storing the arithmetic data in the processor 501 and the data exchanged with the external memory 5022 such as a hard disk. The processor 501 exchanges data with the external memory 5022 through the memory 5021. When the electronic device is running, the processor 501 communicates with the memory 502 through a bus 503, so that the processor 501 executes the execution instructions mentioned in the embodiment of the method described in the above method.

Another embodiment of the present disclosure further provides a non-transient computer-readable storage medium, in which computer programs are stored. When the computer programs are run by at least one processor, the steps of the service control method based on the service cluster described in the above method embodiment are executed. The non-transient computer-readable storage medium can be a volatile or nonvolatile computer-readable storage medium.

The computer program product of the service control method based on the service cluster provided in the embodiment of the present disclosure includes a computer-readable storage medium in which program codes are stored. The program codes include instructions that can be used to execute the steps of the service control method based on the service cluster described in the above method embodiment, which can be specifically described in the method embodiment, and is not repeated herein The computer program product can be implemented in hardware, software, or a combination thereof. In one optional embodiment, the computer program product is embodied as a computer storage medium, and in another optional embodiment, the computer program product is embodied in a software product, such as a software development kit (SDK) and the like.

Those skilled in the art can clearly understand that, for the convenience and conciseness of the description, the specific working process of the system and device described above can refer to the corresponding process in the aforesaid method embodiment, and will not be repeated here. In several embodiments provided in the present disclosure, it should be understood that the disclosed systems, devices and methods can be realized by other means. The device embodiments described above are only schematic, for example, the division of the units is only a logical function division, and there may be another division mode when the actual implementation is realized, and for example, a plurality of units or components can be combined or can be integrated into another system, or some features can be ignored, or not executed. On the other hand, the coupling or direct coupling or communication connection between each other shown or discussed may be indirect coupling or communication connection through some communication interface, device or unit, which may be in electrical, mechanical or other form.

The unit described as a description of the detached part may or may not be physically separated, and the part displayed as a unit may or may not be a physical unit, that is, may be located in a place, or may also be distributed on a plurality of network units. Some or all of the units can be selected according to actual needs to realize the purpose of the present embodiment.

In addition, each functional unit in each embodiment of the present disclosure may be integrated in a processing unit, or each unit may exist separately physically, or two or more units may be integrated in a single unit.

The described function, if implemented in the form of a software functional unit and marketed or used as a stand-alone product, may be stored in a non-volatile computer-readable storage medium executable by a processor. Based on this understanding, the technical solution of the present disclosure is in essence or the part that contributes to the prior art or the part of the technical solution may be embodied in the form of a software product stored in a storage medium that includes instructions for enabling an electronic device (which may be a personal computer, server, or network equipment, etc.) to perform all or part of the steps of the method described in each embodiment of the present disclosure. The aforementioned storage media include: USB flash drive, mobile hard disk, Read-Only Memory (ROM), Random Access Memory (RAM), disk or optical disc and other media that can store program code.

If the technical solution for disclosure involves personal information, the products applying the technical solution for disclosure have clearly informed the rules for handling personal information and obtained the individual's independent consent before processing personal information. If the technical solution for disclosure involves sensitive personal information, the products applying the technical solution for disclosure have obtained the individual's separate consent before processing sensitive personal information, and at the same time meet the requirements of "express consent". For example, in the case of a personal information collection device such as a camera, a clear and conspicuous sign is set up to inform that the personal information collection scope has been entered and that the personal information will be collected, and if the individual voluntarily enters the collection area, the personal information will be deemed to have consented to the collection of the personal information. In the case of information informing the personal information processing rules, the individual's authorization is obtained through pop-up information or by asking the individual to upload his or her personal information on his or her own, where the personal information processing rules may include information such as the personal information processor, the purpose of personal information processing, the method of processing, and the type of personal information processed.

Finally, it should be noted that the above-mentioned embodiments are only specific embodiments of the present disclosure, which are used to illustrate the technical solutions of the present disclosure, not to limit them, and the scope of protection of the present disclosure is not limited to this, although the present disclosure is described in detail with reference to the aforesaid embodiments, a person skilled in the art should understand that any person skilled in the art who is familiar with the art can still modify or easily think of changes to the technical solutions described in the foregoing embodiments, or replace some of the technical features therein, and these modifications, change or replacement, which does not depart the essence of the corresponding technical solution from the spirit and scope of the embodiment of the present disclosure, shall be covered by the scope of protection of the present disclosure. Therefore, the scope of protection of this disclosure shall be described in accordance with the scope of protection of the claims.

The invention claimed is:

1. A service control method based on a service cluster, comprising:
   acquiring operation index information generated by a target service cluster when a task runs;
   calling one or more strategy models in a strategy model library to perform anomaly analysis on the operation index information, and determining target anomaly information of an anomaly occurring in the target service cluster when the task runs and a corresponding target solution strategy, wherein the strategy model library is used to maintain the one or more strategy models, and each strategy model is used to analyze an anomaly situation in a certain dimension that exists in the target service cluster when the task runs, and formulate a solution strategy for the anomaly situation, wherein different strategy models respectively have an ability of analyzing anomaly situations in different dimensions and formulating corresponding solution strategies; and
   sending a configuration updating indication carrying the target solution strategy to the target service cluster, wherein the configuration updating indication is used to indicate the target service cluster to modify configuration information of the target service cluster according to the target solution strategy,
   wherein the acquiring operation index information generated by a target service cluster when a task runs, comprises:
   acquiring operation index information corresponding to the target service cluster during an execution time period from an index database corresponding to the target service cluster, wherein the index database is used to dynamically maintain the operation index information generated when the target service cluster executes the task.

2. The method according to claim 1, wherein the sending a configuration updating indication carrying the target solution strategy to the target service cluster, comprises:
   according to a strategy type to which the target solution strategy belongs, determining a target interface matched with the strategy type from a plurality of configuration modification interfaces corresponding to the target service cluster, wherein different configuration modification interfaces are used to call different configuration modification functions, and the different configuration modification functions are preset according to the anomaly situations in different dimensions; and
   sending the configuration updating indication to the target service cluster through the target interface, and calling a target configuration modification function matched with the target interface, wherein the target service cluster is configured to use the target configuration modification function that is called, and modify the configuration information of the target service cluster according to the target solution strategy carried in the configuration updating indication.

3. The method according to claim 1, wherein the sending a configuration updating indication carrying the target solution strategy to the target service cluster, comprises:
   determining a total quantity of solution strategies that have been generated in a preset historical period; and
   in a case where the total quantity is less than a preset quantity, sending the configuration updating indication carrying the target solution strategy to the target service cluster.

4. The method according to claim 1, wherein the acquiring operation index information generated by a target service cluster when a task runs, comprises:
   receiving a first check request sent by the target service cluster, and in a case where the first check request is used to request to perform a multi-dimensional runtime anomaly detection on the target service cluster, then in response to the first check request, executing the acquiring operation index information generated by the target service cluster when the task runs; or,
   receiving a second check request sent by an operation and maintenance terminal, and in a case where the second check request is used to request to perform a multi-dimensional runtime anomaly detection on the target service cluster, then in response to the second check request, executing the acquiring operation index information generated by the target service cluster when the task runs.

5. The method according to claim 1, wherein the calling one or more strategy models in a strategy model library to perform anomaly analysis on the operation index information, and determining target anomaly information of an anomaly occurring in the target service cluster when the task runs and a corresponding target solution strategy, comprises:
   calling the one or more strategy models in the strategy model library to perform anomaly analysis on the operation index information, and obtaining an anomaly analysis result output by each strategy model; and
   based on the anomaly analysis result and a priority corresponding to each strategy model, selecting an anomaly analysis result that has a highest priority and characterizes the anomaly existing as a target anomaly analysis result, wherein the target anomaly analysis result includes the target anomaly information and the corresponding target solution strategy.

6. The method according to claim 5, wherein the calling the one or more strategy models in the strategy model library to perform anomaly analysis on the operation index information, and obtaining an anomaly analysis result output by each strategy model, comprises:
   for any one of the strategy models that are called, using the strategy model to acquire execution condition information of the target service cluster when the task runs and strategy configuration information corresponding to the strategy model from a preset target database, wherein the target database is used to dynamically maintain the execution condition information set for each service cluster and the strategy configuration information set for each strategy model;
   according to each task execution condition indicated by the execution condition information, judging whether the operation index information indicates that the target service cluster has the anomaly situation; and
   in response to the target service cluster having the anomaly situation, according to the strategy configuration information, formulating the solution strategy for the anomaly situation existing in the target service cluster, and taking the anomaly situation and the solution strategy as the output anomaly analysis result.

7. The method according to claim 6, wherein, according to the strategy configuration information, the formulating the solution strategy for the anomaly situation existing in the target service cluster, comprises:
   acquiring historical state information of the target service cluster in a case where the anomaly situation is that cluster resources are larger than target resources required when the task runs, wherein the historical state information is used to indicate resource node quantities of the target service cluster in different time periods;
   determining a first resource node quantity in a target time period from resource node quantities indicated by the historical state information;
   determining a target resource node quantity according to the first resource node quantity and a second resource node quantity required for providing the target resources; and
   formulating the solution strategy for the anomaly situation according to the strategy configuration information, wherein the solution strategy is used to indicate that an original resource node quantity corresponding to the cluster resources is reduced to the target resource node quantity.

8. An electronic device, comprising:
   at least one processor and a memory,
   wherein the memory stores machine-readable instructions executed by the at least one processor, and the at least one processor is used to execute the machine-readable instructions stored in the memory, and when the machine-readable instructions are executed by the at least one processor, the at least one processor is caused to:
   acquire operation index information generated by a target service cluster when a task runs;
   call one or more strategy models in a strategy model library to perform anomaly analysis on the operation index information, and determine target anomaly information of an anomaly occurring in the target service cluster when the task runs and a corresponding target solution strategy, wherein the strategy model library is used to maintain the one or more strategy models, and each strategy model is used to analyze an anomaly situation in a certain dimension that exists in the target service cluster when the task runs, and formulate a solution strategy for the anomaly situation, wherein different strategy models respectively have an ability of analyzing anomaly situations in different dimensions and formulating corresponding solution strategies; and send a configuration updating indication carrying the target solution strategy to the target service cluster, wherein the configuration updating indication is used to indicate the target service cluster to modify configuration information of the target service cluster according to the target solution strategy, wherein when acquiring the operation index information generated by the target service cluster when the task runs, the at least one processor is further caused to:

acquire operation index information corresponding to the target service cluster during an execution time period from an index database corresponding to the target service cluster, wherein the index database is used to dynamically maintain the operation index information generated when the target service cluster executes the task.

9. The electronic device according to claim 8, wherein when sending the configuration updating indication carrying the target solution strategy to the target service cluster, the at least one processor is further caused to:

according to a strategy type to which the target solution strategy belongs, determine a target interface matched with the strategy type from a plurality of configuration modification interfaces corresponding to the target service cluster, wherein different configuration modification interfaces are used to call different configuration modification functions, and the different configuration modification functions are preset according to the anomaly situations in different dimensions; and send the configuration updating indication to the target service cluster through the target interface, and call a target configuration modification function matched with the target interface, wherein the target service cluster is configured to use the target configuration modification function that is called, and modify the configuration information of the target service cluster according to the target solution strategy carried in the configuration updating indication.

10. The electronic device according to claim 8, wherein when sending the configuration updating indication carrying the target solution strategy to the target service cluster, the at least one processor is further caused to:

determine a total quantity of solution strategies that have been generated in a preset historical period; and in a case where the total quantity is less than a preset quantity, send the configuration updating indication carrying the target solution strategy to the target service cluster.

11. The electronic device according to claim 8, wherein when acquiring the operation index information generated by the target service cluster when the task runs, the at least one processor is further caused to:

receive a first check request sent by the target service cluster, and in a case where the first check request is used to request to perform a multi-dimensional runtime anomaly detection on the target service cluster, then in response to the first check request, execute the acquiring operation index information generated by the target service cluster when the task runs; or, receive a second check request sent by an operation and maintenance terminal, and in a case where the second check request is used to request to perform a multi-dimensional runtime anomaly detection on the target service cluster, then in response to the second check request, execute the acquiring operation index information generated by the target service cluster when the task runs.

12. The electronic device according to claim 8, wherein when calling one or more strategy models in a strategy model library to perform anomaly analysis on the operation index information, and determining target anomaly information of an anomaly occurring in the target service cluster when the task runs and a corresponding target solution strategy, the at least one processor is further caused to:

call the one or more strategy models in the strategy model library to perform anomaly analysis on the operation index information, and obtain an anomaly analysis result output by each strategy model; and based on the anomaly analysis result and a priority corresponding to each strategy model, select an anomaly analysis result that has a highest priority and characterizes the anomaly existing as a target anomaly analysis result, wherein the target anomaly analysis result includes the target anomaly information and the corresponding target solution strategy.

13. The electronic device according to claim 12, wherein when calling the one or more strategy models in the strategy model library to perform anomaly analysis on the operation index information, and obtaining an anomaly analysis result output by each strategy model, the at least one processor is further caused to:

for any one of the strategy models that are called, use the strategy model to acquire execution condition information of the target service cluster when the task runs and strategy configuration information corresponding to the strategy model from a preset target database, wherein the target database is used to dynamically maintain the execution condition information set for each service cluster and the strategy configuration information set for each strategy model;

according to each task execution condition indicated by the execution condition information, judge whether the operation index information indicates that the target service cluster has the anomaly situation; and in response to the target service cluster having the anomaly situation, according to the strategy configuration information, formulate the solution strategy for the anomaly situation existing in the target service cluster, and take the anomaly situation and the solution strategy as the output anomaly analysis result.

14. The electronic device according to claim 13, wherein, when according to the strategy configuration information, formulating the solution strategy for the anomaly situation existing in the target service cluster, the at least one processor is further caused to:

acquire historical state information of the target service cluster in a case where the anomaly situation is that cluster resources are larger than target resources required when the task runs, wherein the historical state information is used to indicate resource node quantities of the target service cluster in different time periods;

determine a first resource node quantity in a target time period from resource node quantities indicated by the historical state information;

determine a target resource node quantity according to the first resource node quantity and a second resource node quantity required for providing the target resources; and formulate the solution strategy for the anomaly situation according to the strategy configuration information, wherein the solution strategy is used to indicate that an original resource node quantity corresponding to the cluster resources is reduced to the target resource node quantity.

15. A non-transient computer-readable storage medium, wherein the non-transient computer-readable storage medium stores computer programs, and when the computer programs are run by an electronic device, the electronic device is caused to:

acquire operation index information generated by a target service cluster when a task runs;

call one or more strategy models in a strategy model library to perform anomaly analysis on the operation index information, and determine target anomaly information of an anomaly occurring in the target service cluster when the task runs and a corresponding target solution strategy, wherein the strategy model library is used to maintain the one or more strategy models, and each strategy model is used to analyze an anomaly situation in a certain dimension that exists in the target service cluster when the task runs, and formulate a solution strategy for the anomaly situation, wherein different strategy models respectively have an ability of analyzing anomaly situations in different dimensions and formulating corresponding solution strategies; and send a configuration updating indication carrying the target solution strategy to the target service cluster, wherein the configuration updating indication is used to indicate the target service cluster to modify configuration information of the target service cluster according to the target solution strategy, wherein when acquiring the operation index information generated by the target service cluster when the task runs, the electronic device is further caused to:

acquire operation index information corresponding to the target service cluster during an execution time period from an index database corresponding to the target service cluster, wherein the index database is used to dynamically maintain the operation index information generated when the target service cluster executes the task.

16. The non-transient computer-readable storage medium according to claim 15, wherein when sending a configuration updating indication carrying the target solution strategy to the target service cluster, the electronic device is further caused to:

according to a strategy type to which the target solution strategy belongs, determine a target interface matched with the strategy type from a plurality of configuration modification interfaces corresponding to the target service cluster, wherein different configuration modification interfaces are used to call different configuration modification functions, and the different configuration modification functions are preset according to the anomaly situations in different dimensions; and send the configuration updating indication to the target service cluster through the target interface, and call a target configuration modification function matched with the target interface, wherein the target service cluster is configured to use the target configuration modification function that is called, and modify the configuration information of the target service cluster according to the target solution strategy carried in the configuration updating indication.

17. The non-transient computer-readable storage medium according to claim 15, wherein when sending the configuration updating indication carrying the target solution strategy to the target service cluster, the electronic device is further caused to:

determine a total quantity of solution strategies that have been generated in a preset historical period; and in a case where the total quantity is less than a preset quantity, send the configuration updating indication carrying the target solution strategy to the target service cluster.

18. The non-transient computer-readable storage medium according to claim 15, wherein when acquiring the operation index information generated by the target service cluster when the task runs, the electronic device is further caused to:

receive a first check request sent by the target service cluster, and in a case where the first check request is used to request to perform a multi-dimensional runtime anomaly detection on the target service cluster, then in response to the first check request, execute the acquiring operation index information generated by the target service cluster when the task runs; or, receive a second check request sent by an operation and maintenance terminal, and in a case where the second check request is used to request to perform a multi-dimensional runtime anomaly detection on the target service cluster, then in response to the second check request, execute the acquiring operation index information generated by the target service cluster when the task runs.

19. The non-transient computer-readable storage medium according to claim 15, wherein when calling one or more strategy models in a strategy model library to perform anomaly analysis on the operation index information, and determining target anomaly information of an anomaly occurring in the target service cluster when the task runs and a corresponding target solution strategy, the electronic device is further caused to:

call the one or more strategy models in the strategy model library to perform anomaly analysis on the operation index information, and obtain an anomaly analysis result output by each strategy model; and based on the anomaly analysis result and a priority corresponding to each strategy model, select an anomaly analysis result that has a highest priority and characterizes the anomaly existing as a target anomaly analysis result, wherein the target anomaly analysis result includes the target anomaly information and the corresponding target solution strategy.

20. The non-transient computer-readable storage medium according to claim 19, wherein when calling the one or more strategy models in the strategy model library to perform anomaly analysis on the operation index information, and obtaining an anomaly analysis result output by each strategy model, the electronic device is further caused to:

for any one of the strategy models that are called, use the strategy model to acquire execution condition information of the target service cluster when the task runs and strategy configuration information corresponding to the strategy model from a preset target database, wherein the target database is used to dynamically maintain the execution condition information set for each service cluster and the strategy configuration information set for each strategy model;

according to each task execution condition indicated by the execution condition information, judge whether the operation index information indicates that the target service cluster has the anomaly situation; and in response to the target service cluster having the anomaly situation, according to the strategy configuration information, formulate the solution strategy for the anomaly situation existing in the target service cluster, and take the anomaly situation and the solution strategy as the output anomaly analysis result.

* * * * *